United States Patent [19]
Wiest et al.

[11] 3,911,053
[45] Oct. 7, 1975

[54] GRAFT COPOLYMER PRESSURE-SENSITIVE ADHESIVES

[75] Inventors: Hubert Wiest; Alois Stoll; Hans-Herbert Nunner, all of Burghausen, Germany

[73] Assignee: Wacker-chemie G.m.b.H., Munich, Germany

[22] Filed: Oct. 26, 1973

[21] Appl. No.: 409,912

[30] Foreign Application Priority Data
Oct. 30, 1972 Germany .......................... 2253245

[52] U.S. Cl. ............................ 260/878 R; 260/878
[51] Int. Cl.² ................ C08L 23/08; C08F 255/02
[58] Field of Search ............................... 260/878 R

[56] References Cited
UNITED STATES PATENTS

| | | | |
|---|---|---|---|
| 3,355,516 | 11/1967 | Hardt et al. | 260/878 R |
| 3,547,756 | 12/1970 | Oberst et al. | 260/878 R |
| 3,646,164 | 2/1972 | Deichert et al. | 260/878 R |
| 3,712,934 | 1/1973 | Kiuchi et al. | 260/878 R |
| 3,734,819 | 5/1973 | Knutson | 260/878 R |
| 3,737,483 | 6/1973 | Kosaka et al. | 260/878 R |
| 3,749,756 | 7/1973 | Kosaka et al. | 260/878 R |
| 3,773,699 | 11/1973 | Bergmeister et al. | 260/878 R |
| 3,805,985 | 4/1974 | Hagiwara et al. | 260/878 R |
| 3,808,294 | 4/1974 | Sato et al. | 260/878 R |

*Primary Examiner*—Joseph L. Schofer
*Assistant Examiner*—A. Holler
*Attorney, Agent, or Firm*—Hammond & Littell

[57] ABSTRACT

Graft copolymers for use as polymeric pressure-sensitive adhesives consisting of (I) from 5 to 35% by weight of a graft base consisting of a copolymer of 40% to 75% by weight of ethylene, 25 to 60% by weight of vinyl acetate, and (II) from 65 to 95% by weight of a monomer mixture grafted to said graft base consisting of (a) from 5 to 60% by weight of vinyl esters of carboxylic acids having 2 to 4 carbon atoms, (b) from 40 to 95% by weight of vinyl esters of carboxylic acids with 6 to 18 carbon atoms and/or esters of $\alpha,\beta$-unsaturated carboxylic acids with alcohols having 3 to 18 carbon atoms, and/or mono or diesters of unsaturated dicarboxylic acids with alcohols having 3 to 18 carbon atoms, and (c) from 0 to 20% by weight of other olefinically-unsaturated copolymerizable monomers.

5 Claims, No Drawings

GRAFT COPOLYMER PRESSURE-SENSITIVE ADHESIVES

THE PRIOR ART

Numerous homopolymers, copolymers, terpolymers, graft polymers and their mixtures, also with naturally occurring resins or waxes, have been previously proposed for use as polymeric adhesives. The demands of modern technology, however, are for ever higher requirements of tackiness and cohesion. And the tackiness is expected to become effective immediately on application. Moreover, these properties must not be lost by aging.

Such polymer adhesives are often used as pressure-sensitive adhesives, in particular for self-gluing labels, name plates, tapes and foils of a variety of support materials. Additional requirements of such adhesives are resistance to spilling over the support material edge (no cold flow) and resistance to migration into porous substrates (no grease penetration).

The rubber-based pressure-sensitive adhesives hitherto used industrially in mixture with low molecular resins, respectively, acryl or vinyl ester polymers, are applied on the support materials dissolved in organic solvents or as aqueous emulsions. For the industrially more advantageous melt-on method, these pressure-sensitive adhesives can be employed only when using polymers of low molecular weight or high added quantities of low-molecular substances, such as resins and plasticizers, but then the cohesion and aging stability properties are decreased.

In German Pat. No. 1,289,594, copolymers of vinyl acetate and vinyl laurate are described as pressure-sensitive adhesives which can be applied from the molten state despite a relatively high molecular weight. Such adhesives, however, tend to cold flow, which is noticeable in small-size articles, such as labels, by the spilling of adhesive over the edge which leads to soiling.

OBJECTS OF THE INVENTION

An object of the invention is to provide a polymeric pressure-sensitive adhesive which possesses the properties of tackiness and cohesion in a high degree, has excellent aging stability, does not tend to cold flow or grease penetration, and offers the possibility of melt-on application.

Another object of the invention is the development of graft copolymers for use as polymeric pressure-sensitive adhesives consisting of (I) from 5 to 35% by weight of a graft base soluble in the monomer component selected from the group consisting of (i) a copolymer of 40 to 75% by weight of said copolymer of ethylene, 25 to 60% by weight of said copolymer of vinyl acetate and 0 to 10% by weight of said copolymer of monomers copolymerizable with ethylene and vinyl acetate, (ii) said copolymer with up to 10% by weight of said copolymer of vinyl alcohol units derived from vinyl acetate units, (iii) mixtures of 25 to 99.9% by weight of said copolymer with from 0.1 to 75% by weight of other graftable polymers soluble in the monomer component, and (II) from 65 to 95% by weight of a monomer mixture grafted to said graft base consisting of (a) from 5 to 60% by weight of said mixture of vinyl esters of alkanoic acids having 2 to 4 carbon atoms, (b) from 40 to 95% by weight of said mixture of monomers selected from the group consisting of vinyl esters of alkanoic acids having 6 to 18 carbon atoms, esters of $\alpha,\beta$-alkenoic acids having 3 to 8 carbon atoms with alkanols having 3 to 18 carbon atoms, esters of alkenedioic acids having 4 to 8 carbon atoms with alkanols having 3 to 18 carbon atoms, and mixtures thereof, and (c) from 0 to 20% by weight of other olefinically-unsaturated compounds copolymerizable with said components (a) and (b).

A yet further object of the present invention is the development of flexible support materials coated on one side with from 5 to 100 gm/m$^2$ of the above graft copolymers.

These and other objects of the invention will become more apparent as the description thereof proceeds.

DESCRIPTION OF THE INVENTION

The drawbacks of the prior art have been overcome and the above objects achieved by the development of graft copolymers for use as polymeric pressure-sensitive adhesives consisting of (1) from 5 to 35% by weight of a graft base consisting of a copolymer of 40 to 75% by weight of ethylene, 25 to 60% by weight of vinyl acetate, and (II) from 65 to 95% by weight of a monomer mixture grafted to said graft base consisting of (a) from 5 to 60% by weight of vinyl esters of carboxylic acids having 2 to 4 carbon atoms, (b) from 40 to 95% by weight of vinyl esters of carboxylic acids with 6 to 18 carbon atoms and/or esters of $\alpha,\beta$-unsaturated carboxylic acids with alcohols having 3 to 18 carbon atoms, and/or mono or di esters of unsaturated dicarboxylic acids with alcohols having 3 to 18 carbon atoms, and (c) from 0 to 20% by weight of other olefinically-unsaturated copolymerizable monomers.

Of the graft base, the ethylene/vinyl acetate copolymer, up to 75% by weight, preferably 15 to 50% by weight may be replaced by other polymers soluble in the monomer mixture, in particular polyvinyl ethers.

Therefor the present invention, preferably relates to graft copolymers for use as polymeric pressure-sensitive adhesives consisting of (I) from 5 to 35% by weight of a graft base soluble in the monomer component selected from the group consisting of (i) a copolymer of 40 to 75% by weight of said copolymer of ethylene, 25 to 60% by weight of said copolymer of vinyl acetate and 0 to 10% by weight of said copolymer of monomers copolymerizable with ethylene and vinyl acetate (ii) said copolymer with up to 10% by weight of said copolymer of vinyl alcohol units derived from vinyl acetate units, (iii) mixtures of 25 to 99.9% by weight of said copolymer with from 0.1 to 75% by weight of other graftable polymers soluble in the monomer component, and (II) from 65 to 95% by weight of a monomer mixture grafted to said graft base consisting of (a) from 5 to 60% by weight of said mixture of vinyl esters of alkanoic acids having 2 to 4 carbon atoms, (b) from 40 to 95% by weight of said mixture of monomers selected from the group consisting of vinyl esters of alkanoic acids having 6 to 18 carbon atoms, esters of $\alpha,\beta$-alkenoic acids having 3 to 8 carbon atoms with alkanols having 3 to 18 carbon atoms, esters of alkenedioic acids having 4 to 8 carbon atoms with alkanols having 3 to 18 carbon atoms, and mixtures thereof, and (c) from 0 to 20% by weight of other olefinically-unsaturated compounds copolymerizable with said components (a) and (b).

The graft polymers according to the invention correspond as to their properties to the property pattern which the objects of the invention stipulate. In many cases, moreover, the flexible articles equipped with pressure-sensitive adhesive can be detached from the substrate again without residues of adhesive remaining on the substrate. This favorable property pattern is surprising, especially since mixture of ethylene/vinyl acetate copolymers with separately polymerized polyvinyl esters do not show these good properties and often are not mutually compatible. With these mixtures, inhomogeneous melts with phase separation or much higher melt viscosities then those which the copolymers of the invention exhibit are obtained. Neither the ethylene/vinyl acetate copolymers nor the vinyl ester polymers show by themselves or in mixtures the properties demanded of polymeric pressure-sensitive adhesives. Ethylene/vinyl acetate copolymers do not have the necessary tackiness and adhesion, the vinyl ester polymers often show too low a cohesion and tend to cold flow. Besides they are absorbed by porous support materials or substrates, such as paper, this leading to a fatty appearance and to a decrease in adhesivity. Further they have a hard stick-on behavior, i.e., the adhesion is sufficient only after rubbing on or after some storage time, and they cannot be detached again from a substrate without leaving a residue of adhesive.

The graft copolymers according to the invention are produced by dissolving the copolymer or copolymer mixture in the monomer mixtures and graft-polymerizing them in the presence of free-radical-formers, especially oil-soluble free-radical-formers, in amounts of from 0.02 to 4%, preferably 0.08 to 0.8% by weight, based on the monomer mixture, at temperatures of from $-20°$ to $150°C$. The commercial ethylene/vinyl acetate copolymers are suitable as the copolymer graft base. These are usually free-radically-polymerized by known methods, e.g., in aqueous emulsion, in bulk, or in solution. The ethylene content is preferably from 45 to 65% by weight and they usually have a melt index ($i_2$) of 5 to 100. They may in addition, contain up to 10% by weight of unsaturated compounds copolymerizable with ethylene and vinyl acetate, in particular unsaturated carboxylic acids such as alkenoic acids having 3 to 8 carbon atoms, like acrylic acid, copolymerized in the copolymer. Also copolymers with up to 10% by weight of vinyl alcohol units are optionally usuable as are obtained by a partial saponification of the ethylene/vinyl acetate copolymer. Generally from 5 to 35%, preferably 6 to 25% by weight, of copolymer is utilized as a graft base, based on the solution of the copolymer in the monomer mixture.

Further it is also possible to use the above stated quantities of up to 75% by weight, preferably 15 to 50% by weight (or 0 to 50% by weight) of additional polymers soluble in the monomer mixture, instead of corresponding quantities of the ethylene/vinyl acetate copolymer. Examples of these copolymers are polyisobutylene, styrene/butadiene copolymers, and in particular polyvinyl ethers, such as polyvinyl lower alkyl ethers, for example polyvinyl ethyl ether, polyvinyl propyl ether, and polyvinyl isobutyl ether.

Examples of the vinyl esters of carboxylic acids having 2 to 4 carbon atoms under a) are the vinyl alkanoates having 4 to 6 carbon atoms such as vinyl propionate, vinyl butyrate, and preferably vinyl acetate. More particularly they are used in amounts of 15 to 50% by weight referred to total monomer quantity. Also their mixtures may be used.

As examples of the vinyl esters with carboxylic acids having 6 to 18 carbon atoms under b are the vinyl alkanoates having 8 to 20 carbon atoms such as the vinyl ester of 2-ethylhexanoic acid, vinyl capronate, vinyl caprinate, vinyl isononanoate, vinyl esters of the Versatic acids, vinyl laurate and vinyl stearate. Also their mixtures may be used.

Further examples under b of $\alpha,\beta$-unsaturated carboxylic acids and unsaturated dicarboxylic acids are the $\alpha,\beta$-alkenoic acids having 3 to 8 carbon atoms, such as acrylic acid, methacrylic acid, crotonic acid etc., and the alkenedioic acids having 4 to 8 carbon atoms, such as itaconic acid, fumaric acid, and maleic acid, and examples of the straight-chain or branched alcohols esterified with them are the alkanols having 3 to 18 carbon atoms such as propyl alcohol, butyl alcohol, 2-ethylhexyl alcohol, stearyl alcohol, etc. In addition other alcohols such as glycidyl alcohol may be employed. The monomers can be used singly or in mixture, preferably in quantities of 50 to 80% by weight based on the total amount of monomer. Also their mixtures can be used.

Optionally also additional monomers copolymerizable with monomer components (a) and (b) can be used in amounts of from 0 to up to 20% weight based on the total amount of monomer. Preferably under consideration are the unsaturated acids, more particularly the $\alpha,\beta$-alkenoic acids having 3 to 8 carbon atoms and the alkenedioic acids having 4 to 8 carbon atoms, as for example acrylic, methacrylic, crotonic, fumaric and maleic acid, but also acrylamide, N-lower alkyl substituted acrylamides, methacrylamide, $\alpha\beta$-olefins having 2 to 7 carbon atoms such as ethylene, propylene styrene, acrylonitrile and vinyl chloride. Also their mixtures may be used.

To be able to carry out the grafting, the copolymer (possibly with the additional polymers) is dissolved in the monomer mixture. Free-radical-formers for initiating the grafting may be, for example, the oil-soluble compounds, such as azo or peroxy compounds such as azo-isobutyronitrile, lauroyl peroxide, t.-butyl hydroperoxide, benzoyl peroxide, diisopropyl peroxydicarbonate. Also redox systems of reducing agents, such as hydrazines, amines, sulfinic acids, and peroxides may be used. To obtain uniform polymerization and complete conversion several catalysts may be used, adding them proportionately over the entire time of polymerization.

The graft polymerization is carried out at temperatures of $-20°$ to $150°C$, preferably $50°$ to $130°C$, often while raising the temperature during the polymerization, and usually at the autogenous pressure of the monomers. When using gaseous monomers, such as ethylene, it is often necessary to apply elevated pressures. In some cases it is also advantageous not to charge the entire monomer mixture, before polymerization, but to proportion parts thereof or to add only certain monomers to the monomer mixture during the polymerization. Also the polymerization may be started with only a portion of the copolymer dissolved in the monomer, with further introduction of the monomer/copolymer mixture taking place during the polymerization.

The K-value of the product thus prepared should generally be between 35 and 65, preferably 45 to 60, as measured in acetone. This value can be adjusted to the desired level by addition of polymerization regulators, such as aldehydes, halogenated hydrocarbons or mercaptans, to the polymerization batch.

The graft polymers according to the invention are tacky, viscous compositions, which are practically free of cold flow at room temperature. At temperatures of 100° to 200°C they form homogeneous melts. They can be used in various ways, for example as adhesives which are applied from solutions, as backing adhesives, or in particular as fusion bonding adhesives. In the molten state they can be applied on the support materials by spray nozzle or roll applicator systems. They are ordinarily applied to the flexible support materials in amounts of from 5 to 100 gm/m². Examples of flexible support materials are plastic foils, textiles, metal foils, cardboard and in particular paper. The adhesives are not absorbed by paper even after several weeks' storage at 70°C. Thus the adhesive is excellently suitable for the production of self-gluing labels. Since it does not tend to cold flow, spilling over the label edge does not occur.

The graft copolymers of the invention can be employed as such, or they may be combined with a variety of substances, such as colophony resins, coumaron resins, indene resins, phenol-formaldehyde resins and hydrocarbon resins, waxes, paraffin oil, plasticizers, fillers, etc.

The following examples are illustrative of the invention without being restrictive in any manner.

EXAMPLE 1

In a 2-liter reaction vessel equipped with agitator, reflux condenser and nitrogen inlet pipe, 120 gm of an ethylene/vinyl acetate copolymer with a vinyl acetate content of 40% by weight and a melt index of $i_2=60$ were dissolved in a mixture of 360 gm of vinyl acetate and 360 gm of vinyl laurate with reflux and agitation at 70°C, and then the solution was cooled to room temperature. Then 2.5 gm of propionaldehyde and 1.5 gm of benzoyl peroxide were added and the polymerization was initiated by brief heating while stirring and passing a weak nitrogen stream thereover. The main phase of the polymerization set in at an internal temperature of 65°C and was completed after about 70 minutes with a temperature increase to 77°C. Then the temperature was raised to 130°C by slow supply of heat within 60 minutes, with the reflux coming to a stop. The temperature was maintained at 130°C for another 30 minutes. A clear, homogeneous and speck-free polymer melt was obtained, which upon cooling solidified to a viscous-elastic tacky mass. The graft polymer has a K-value according to Finkentscher of 54, measured in a 1% acetone solution. The polymerizate melted at 160°C as a well flowing melt. This melt was applied to paper of 80 gm/m² with a doctor knife in a layer thickness of 25 gm/m² covered with silicone paper. A self-gluing paper was obtained, which adheres on a variety of substrates, and on which the specific tests for adhesivity, colf flow, and resistance to penetration and shearing strength were carried out.

The adhesivity is measured in kp/cm on strips 2.5 cm wide and 25 cm long, which, after pulling off the silicone paper to a length of about 12 cm, are placed on a clean glass plate and are applied by rolling 10 times with a roll weighing 2.4 kg without additional pressure, after a storage time of one minute, by peeling them off the plate at an angle of 180° at a rate of 30 cm/min.

The cold flow is tested on 10 stacked paper disks covered with silicone paper of 5 cm diameter, which are exposed for 3 days to a pressure of 8 kp/cm. After this compressive stress, the spilling of adhesive over the paper edge and the sticking of the disks together is determined.

The penetration is tested on a laminate of paper-adhesive-silicone paper after storage for 4 weeks at 70°C. The top side of the paper is rated for dots or spots (fat penetration) of the adhesive which has migrated into the paper.

To measure the shearing strength, 2.5 cm wide strips are glued over a length of 2 cm on glass by rolling 10 times with a roll weighing 2.4 kg, and after a storage time of 30 minutes they are loaded with a 2 kg weight hanging vertically down and the time until the adhesive strips detach is measured.

From the coating with polymer of Example 1 the following test values were obtained:

Adhesivity after 1 min., 0.6 kp/2.5 cm, after 24 hours, 1.0 kp/2.5 cm. Even after 4 weeks' storage of the bond at 70°C a decrease in adhesivity was not observable.

Cold flow and penetration were not observed. The shearing strength was 40 minutes. The aging stability was excellent.

The adhesive was applied in analogous manner on many other support materials (PVC foil, textile, glass fabric, aluminum foil). It showed equally good properties.

EXAMPLE 2 (Comparison)

The same batch as in Example 1, but without addition of the ethylene/vinyl acetate copolymer, was polymerized. The K value of the polymer was 53.

A sticky polymer of distinctly lower cohesion than according to Example 1 was obtained. The adhesivity after 1 min. was 0.7 kp/2.5 cm. Cold flow and penetration were greatly noticeable. The shearing strength was 10 min.

EXAMPLE 3 (Comparison)

To the polymer prepared according to Example 2 there were added, at 150°C, 120 parts of the ethylene/vinyl acetate copolymer utilized in Example 1. A homogeneous melt could not be obtained.

EXAMPLE 4

In the same arrangement as described in Example 1, 60 gm of ethylene/vinyl acetate copolymer with 40% by weight of vinyl acetate and a melt index $i_2=60$ as well as 40 gm of polyvinyl isobutyl ether having a K value of 120 were dissolved in a mixture of 360 gm of vinyl acetate and 360 gm of vinyl laurate at 70°C and cooled again. After addition of 4.5 gm of acetaldehyde and 1.5 gm of lauroyl peroxide the temperature was raised. At 65°C internal temperature, polymerization started. After about 80 minutes the major part of the polymerization was completed with increase of the internal temperature to 76°C. The internal temperature was then slowly raised to 120°C and this temperature was maintained constant for another hour. There was obtained a clear, homogeneous melt, to which 35 gm of polyethylene wax having a melting point of 96°C were admixed, and which upon cooling formed a viscous-elastic sticky composition.

Applied on paper from the molten state, a self-gluing label material was obtained having an adhesivity of 0.7 kp/2.5 cm, which showed no cold flow and no penetration. A shearing strength of 40 minutes was measured.

EXAMPLE 5

The procedure was as in Example 4, but using a mixture of 500 gm of the vinyl ester of 2-ethylhexylic acid and 220 gm of vinyl acetate as the monomer mixture. A polymerization product with a K value of 45 was obtained. 35 gm of polyethylene wax and 70 gm of paraffin oil were admixed to the melt. Coated on paper, a self-gluing label material of an adhesivity of 0.4 kp/2.5 cm was obtained which showed no cold flow and no penetration.

EXAMPLE 6

The procedure was as in Example 1, however 70 gm of ethylene/vinyl acetate copolymer with a vinyl acetate content of 45% by weight and a melt index of $i_2=35$ were dissolved in a monomer mixture of 290 gm of vinyl acetate, 144 gm of butyl acrylate and 216 gm of vinyl laurate. The mixture was polymerized as described in Example 1.

The graft polymerization product was obtained in the form of a clear, homogeneous melt, which upon cooling formed a viscous-elastic, sticky composition and exhibited a K value of 57, measured in acetone. As pressure-sensitive adhesive it showed multilaterally good adhesion. Tested on paper, no cold flow and no penetration were observed.

EXAMPLE 7

The procedure was as in Example 1, however, 80 gm of ethylene/vinyl acetate copolymer with a vinyl acetate content of 40% by weight and a melt index $i_2=60$ were dissolved in a mixture of 340 gm of vinyl acetate and 380 gm of vinyl laurate. In addition, during the polymerization after an internal temperature of 65°C had been attained, 7 gm of crotonic acid dissolved in 20 gm of vinyl acetate was added over a one hour period. After the end of the polymerization, 10 gm of zinc oxide were admixed to the clear homogeneous melt of the graft polymer of a K value of 48. The viscous-elastic graft polymer showed on paper as support material neither cold flow or penetration, the adhesivity was 0.6 kp/2.5 cm after 1 min. and 1.0 kp/2.5 cm after 24 hours. The shearing strength was 200 minutes.

EXAMPLE 8

The procedure was as in Example 1, however, 35 gm of ethylene/vinyl acetate copolymer having a vinyl acetate content of 40% by weight and a melt index $i_2=60$, as well as 15 gm of styrene-butadiene block copolymer with a solution viscosity of 6 cps (Cariflex TR 1102) were dissolved in a mixture of 360 gm of vinyl acetate and 360 gm of vinyl laurate. The mixture was polymerized as described in Example 1. The viscous-elastic, sticky, homogeneous graft polymer obtained had a K value of 48 and furnished pressure-sensitive coatings of high tackiness, without cold flow or penetration being observable.

EXAMPLE 9

The procedure was as in Example 1, however, 50 gm of ethylene/vinyl acetate copolymer of a vinyl acetate content of 45% and a melt index $i_2=40$ and 40 gm of polyvinyl-isobutyl ether having a K value of 110 were dissolved in a mixture of 290 gm of vinyl acetate, 140 gm of diethylhexyl fumarate and 290 gm of vinyl laurate while heating. The cooled solution, admixed with 2.5 gm of benzoyl peroxide, was polymerized by heating to 65°C as described in Example 1. The graft polymer, heated to 130°C toward the end of the polymerization had a K value of 43 and was mixed with 20 gm of an ester wax having a melting point of 94°C and 70 gm of a hydrocarbon resin having a melting point of 110°C. The clear, homogeneous melt formed upon cooling a homogeneous, opaque, viscous-elastic sticky composition, which as a pressure-sensitive adhesive applicable from the molten state can be used for a variety of support materials with the desired good properties.

EXAMPLE 10

The procedure was as in Example 1, however, 100 gm of ethylene/vinyl acetate copolymer of a vinyl acetate content of 45% and a melt index $i_2=60$ was dissolved in a mixture of 420 gm of vinyl isononanoate, 140 gm of 2-ethylhexyl acrylate and 140 gm of vinyl acetate. 360 gm of the cooled solution together with 2.5 gm of benzoyl peroxide and 1 gm of butyraldehyde were caused to polymerize by heating to 65°C. The remaining 440 gm of the solution of ethylene/vinyl acetate copolymer in the monomer mixture were proportioned into the polymerizing batch during the course of 80 minutes. The reaction temperature was raised to 120°C with addition of 0.5 gm of benzoyl peroxide and then maintained constant for 60 minutes. The viscous-elastic sticky graft polymer had a K value of 45 and had an adhesivity of 0.55 kp/2.5 cm after one minute, a shearing strength of 60 minutes, and was suitable for paper coating due to its penetration resistance.

EXAMPLE 11

The procedure was as in Example 1, however, 70 gm of ethylene/vinyl acetate copolymer of a vinyl acetate content of 45% and a melt index $i_2=60$ and 30 gm polyisobutylene of a molecular weight of 50,000 were dissolved in a mixture of 420 gm of 2-ethylhexyl acrylate and 380 gm of vinyl acetate and polymerized with addition of 5 gm of butyraldehyde and 2.5 gm of lauroyl peroxide. The graft polymer obtained had a K value of 60 and furnished pressure-sensitive adhesives of the desired good properties.

The preceeding specific embodiments are illustrative of the practice of the invention. It is to be understood however, that other expedients disclosed herein or known to those skilled in the art may be employed without departing from the spirit of the invention or the scope of the appended claims.

We claim:

1. Graft copolymers for use as polymeric pressure-sensitive adhesives consisting of (I) from 5 to 35% by weight of a graft base soluble in the monomer component selected from the group consisting of (i) a copolymer of 40 to 75% by weight of said copolymer of ethylene, 25 to 60% by weight of said copolymer of vinyl acetate and 0 to 10% by weight of said copolymer of monomers copolymerizable with ethylene and vinyl acetate, (ii) said copolymer with up to 10% by weight of said copolymer of vinyl alcohol units derived from vinyl acetate units, (iii) mixtures of 25 to 99.9% by weight of said copolymer with from 0.1 to 75% by weight of other graftable polymers soluble in the monomer component, and (II) from 65 to 95% by weight of a monomer mixture grafted to said graft base consisting of (a) from 5 to 60% by weight of said mixture of vinyl esters of alkanoic acids having 2 to 4 carbon atoms, (b) from 40 to 95% by weight of said mixture of monomers selected from the group consisting of vinyl esters of alkanoic acids having 6 to 18 carbon atoms, esters of $\alpha,\beta$-alkenoic acids having 3 to 8 carbon atoms with alkanols having 3 to 18 carbon atoms, esters of alkenedioic acids having 4 to 8 carbon atoms with alkanols having 3 to 18 carbon atoms, and mixtures thereof, and (c) from 0 to 20% by weight of other olefinically-unsaturated compounds copolymerizable with said components (a) and (b).

2. The graft polymers of claim 1 wherein said graft base contains from 15 to 50% by weight of other graftable polymers soluble in the monomer component.

3. The graft polymers of claim 2 wherein said other graftable polymers are polyvinyl lower alkyl ethers.

4. The graft polymers of claim 1 wherein said graft base copolymer of ethylene and vinyl acetate has a melt index ($i_2$) of from 5 to 100.

5. A method for the production of graft copolymers for use as polymeric pressure-sensitive adhesives which consists essentially of (I) dissolving from 5 to 35% by weight, based on the total weight of the solution, of a graft base soluble in the monomer component selected from the group consisting of (i) a copolymer of 40 to 75% by weight of said copolymer of ethylene, 25 to 60% by weight of said copolymer of vinyl acetate and 0 to 10% by weight of said copolymer of monomers copolymerizable with ethylene and vinyl acetate, (ii) said copolymer with up to 10% by weight of said copolymer of vinyl alcohol units derived from vinyl acetate units, (iii) mixtures of 25 to 99.9% by weight of said copolymer with from 0.1 to 75% by weight of other graftable polymers soluble in the monomer component, in from 65 to 95% by weight, based on the total weight of the solution, of a monomer mixture consisting of (a) from 5 to 60% by weight of said mixture of vinyl esters of alkanoic acids having 2 to 4 carbon atoms, (b) from 40 to 95% by weight of said mixture of monomers selected from the group consisting of vinyl esters of alkanoic acids having 6 to 18 carbon atoms, esters of $\alpha,\beta$-alkenoic acids having 3 to 8 carbon atoms with alkanols having 3 to 18 carbon atoms, esters of alkenedioic acids having 4 to 8 carbon atoms with alkanols having 3 to 18 carbon atoms, and mixtures thereof, and (c) from 0 to 20% by weight of other olefinically-unsaturated compounds copolymerizable with said components (a) and (b), (II) adding from 0.02 to 4% by weight, based on said monomer mixture, of an oil-soluble free-radical-former polymerization catalyst, (III) polymerizing said solution at a temperature of from $-20°$ to $150°C$ for a time sufficient to effect graft polymerization to give a product having a K-value of from 35 to 65 and (IV) recovering said graft copolymer.

* * * * *